United States Patent
Huang

(10) Patent No.: US 6,525,655 B2
(45) Date of Patent: Feb. 25, 2003

(54) DIAPHRAGM-TYPE TIRE PRESSURE INDICATOR

(76) Inventor: Tien-Tsai Huang, No. 4-2, Lane 30, Wu Chuan St., Pan Chiao City, Taipei (TW)

( * ) Notice: Subject to any disclaimer, the term of this patent is extended or adjusted under 35 U.S.C. 154(b) by 0 days.

(21) Appl. No.: 09/892,762

(22) Filed: Jun. 28, 2001

(65) Prior Publication Data
US 2003/0001733 A1 Jan. 2, 2003

(51) Int. Cl.$^7$ .............................................. B60C 23/02
(52) U.S. Cl. ..................... 340/442; 340/445; 340/447; 340/539; 340/626; 73/146.5; 73/146.8; 116/34 R; 200/61.22; 137/233
(58) Field of Search ................................ 340/442, 447, 340/539, 626, 445; 73/146.5, 146.8; 116/34 R; 200/61.22; 137/233

(56) References Cited
U.S. PATENT DOCUMENTS

| 5,025,244 A | * | 6/1991 | Huang | 340/442 |
| 5,289,161 A | * | 2/1994 | Huang | 340/442 |
| 5,694,111 A | * | 12/1997 | Huang | 340/442 |
| 5,781,104 A | * | 7/1998 | Huang | 340/442 |
| 6,006,600 A | * | 12/1999 | Cheng | 340/442 |

\* cited by examiner

*Primary Examiner*—Daniel J. Wu
*Assistant Examiner*—Hung Nguyen
(74) *Attorney, Agent, or Firm*—Bacon & Thomas, PLLC

(57) ABSTRACT

A diaphragm-type tire pressure indicator is fixedly fastened to the air nozzle of a vehicle tire for indicating a low pressure of the tire. A flexible diaphragm is mounted in a receiving chamber in the casing of the tire pressure indicator. A push rod is connected to the flexible diaphragm for being moved up and down with the diaphragm subject to the status of the tire pressure of the vehicle tire. A sleeve is mounted in the receiving chamber and is around the push rod. A spring is sleeved onto the push rod.

22 Claims, 12 Drawing Sheets

DIAPHRAGM-TYPE TIRE PRESSURE INDICATOR

BACKGROUND OF THE INVENTION

1. Field of the Invention

The present invention relates to a tire pressure indicator and, more particularly, to a diaphragm-type tire pressure indicator.

2. Description of Related Art

Conventionally, a tire pressure indicator is provided for warning insufficient tire pressure, thereby ensuring the safety in driving a vehicle. In such an indicating device, a flexible piston device is generally used to move forwards/backwards subject to the condition of the tire pressure of a vehicle tire, so as to sense the pressure of the tire and thus detect whether the pressure is too low. This conventional tire pressure indicator produces only a small friction during movement of the piston, and the tire pressure indication is relatively accurate.

U.S. Pat. No. 5,677,492 granted to the present inventor discloses a diaphragm-type pressure measuring device, which uses a diaphragm to detect the tire pressure of the vehicle tire. Similar tire pressure indicators are disclosed in U.S. Pat. Nos. 4,945,337, 5,014,643, 5,025,244, 5,289,161, and 5,694,111, for monitoring the tire pressure condition of vehicle tires. These tire pressure indicators are designed subject to different manners in warning low tire pressures. Therefore, based on different tire pressure warning requirements, various tire pressure warning devices, which are different in structures and are assembled in different manners, must be manufactured. As a result, the manufacturing process cannot be simplified and the manufacturing cost is high. Therefore, it is desired for the above conventional tire pressure indicators to be improved, so as to mitigate and/or obviate the aforementioned problems.

SUMMARY OF THE INVENTION

It is one object of the present invention to have a diaphragm-type tire pressure indicator, which has a simple structure and, can be applied to different tire pressure warning manners.

It is another object of the present invention to have a diaphragm-type tire pressure indicator, which has the function of micro-calibration and, is suitable for mass production.

In accordance with one aspect of the present invention, there is provided a diaphragm-type tire pressure indicator for being installed in the air nozzle of a vehicle tire to give an indication when the tire pressure of the vehicle tire is low. The diaphragm-type tire pressure indicator comprises a casing having a receiving chamber and a coupling unit; a flexible diaphragm mounted in the receiving chamber of the casing; a push rod connected to the flexible diaphragm for being moved up and down with the flexible diaphragm; a sleeve mounted in the receiving chamber of the casing and around the push rod, the sleeve having a bottom end and a top end; and a spring means sleeved onto the push rod.

In accordance with another aspect of the present invention, there is provided a diaphragm-type tire pressure indicator for being installed in the air nozzle of a vehicle tire to give an indication when the tire pressure of the vehicle tire is low. The diaphragm-type tire pressure indicator comprises a casing having a receiving chamber and a coupling unit; a movable diaphragm mounted in the receiving chamber of the casing; a push rod connected to the movable diaphragm for being moved up and down with the movable diaphragm; a sleeve mounted in the receiving chamber of the casing and around the push rod, the sleeve having a bottom end and a top end; an adjustment cap fastened to the top end of the sleeve in such a manner that the push rod extends out of the adjustment cap, so as to achieve a micro-calibration function by adjusting a position of the adjustment cap relative to the top end of the sleeve; a spring means sleeved onto the push rod; a conductive member mounted on the adjustment cap; a circuit board electrically mounted on the conductive member, the circuit board having a light emitting element; and a battery seat mounted on the push rod for holding a battery cell, the battery cell having a first electrode connected to the light emitting element and a second electrode electrically connected to the battery seat, wherein the battery seat is moved up and down with the push rod relative to the conductive member so as to selectively contact with the conductive member for turning on the light emitting element.

In accordance with a further aspect of the present invention, there is provided a diaphragm-type tire pressure indicator for being installed in the air nozzle of a vehicle tire to give an indication when the tire pressure of the vehicle tire is low. The diaphragm-type tire pressure indicator comprises a casing having a receiving chamber and a coupling unit; a movable diaphragm mounted in the receiving chamber of the casing; a push rod connected to the diaphragm for being moved up and down with the diaphragm; a sleeve mounted in the receiving chamber of the casing and around the push rod, the sleeve having a bottom end and a top end; an adjustment cap fastened to a top end of the sleeve in such a manner that the push rod extends out of the adjustment cap, so as to achieve a micro-calibration function by adjusting a position of the adjustment cap relative to the top end of the sleeve; a spring means sleeved onto the push rod; a conductive member mounted on the adjustment cap; a circuit board electrically mounted on the conductive member, the circuit board having an RF transmitter module; and a battery seat mounted on the push rod and for holding a battery cell, the battery cell having a first electrode connected to the RF transmitter module and a second electrode electrically connected to the battery seat, wherein the battery seat is moved up and down with the push rod relative to the conductive member so as to selectively contact with the conductive member for outputting a radio signal indicating a low pressure of the tire.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
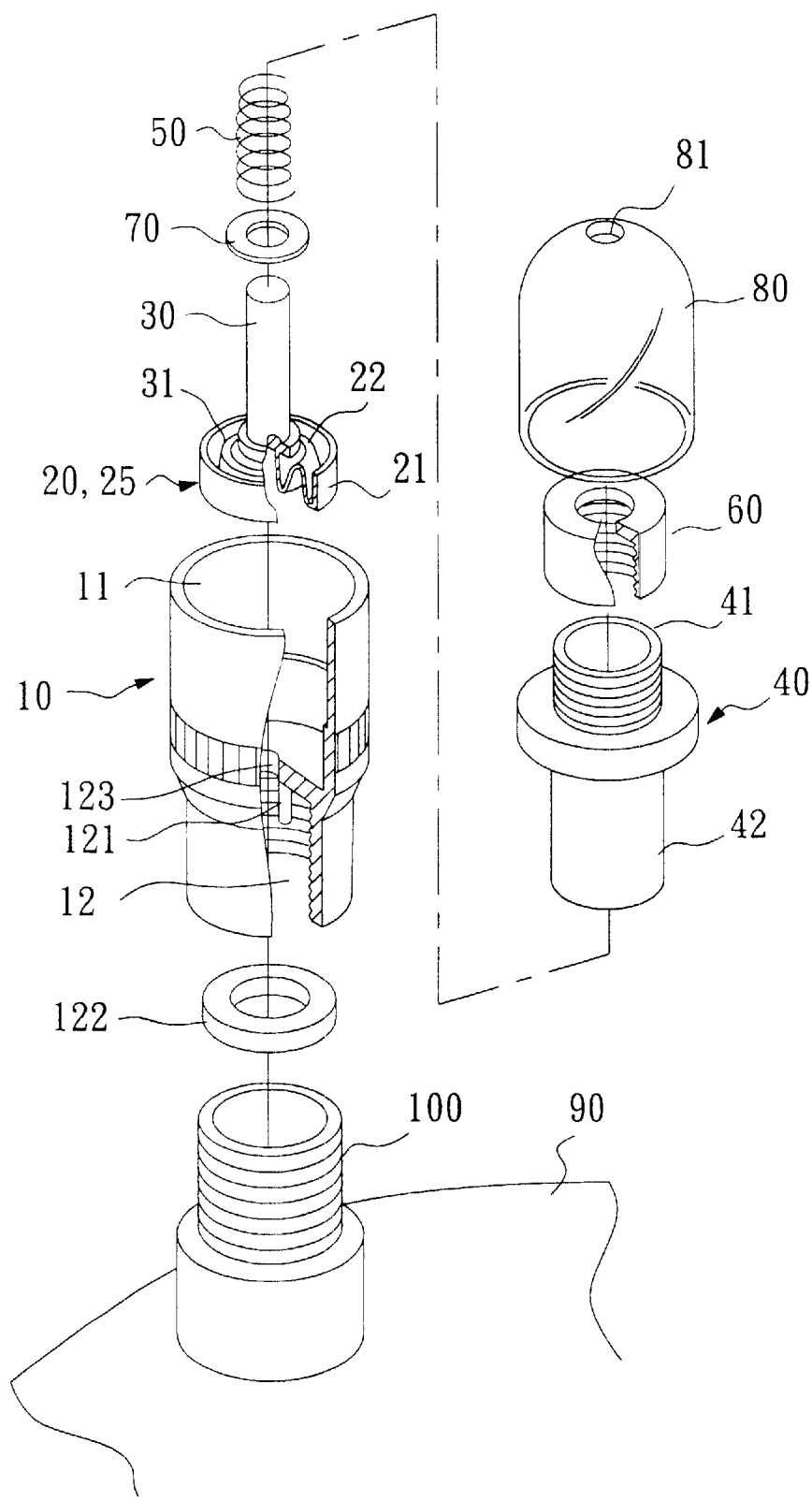
FIG. 1 is an exploded view of the diaphragm-type tire pressure indicator according to a first embodiment of the present invention.

With reference to FIG. 1, there is shown a diaphragm-type tire pressure indicator in accordance with the present invention, which includes a casing 10, a movable diaphragm 20, a push rod 30, a sleeve 40, a spring 50, an adjustment cap 60, a washer 70, and a cover 80. In this embodiment, the movable diaphragm 20 is preferably a flexible diaphragm 25. The push rod 30 has one end integral with the flexible diaphragm 25. Alternatively, the diaphragm 20 can be a corrugated metal diaphragm or a bellows. The cover 80 is made of transparent material.

Figure 2:
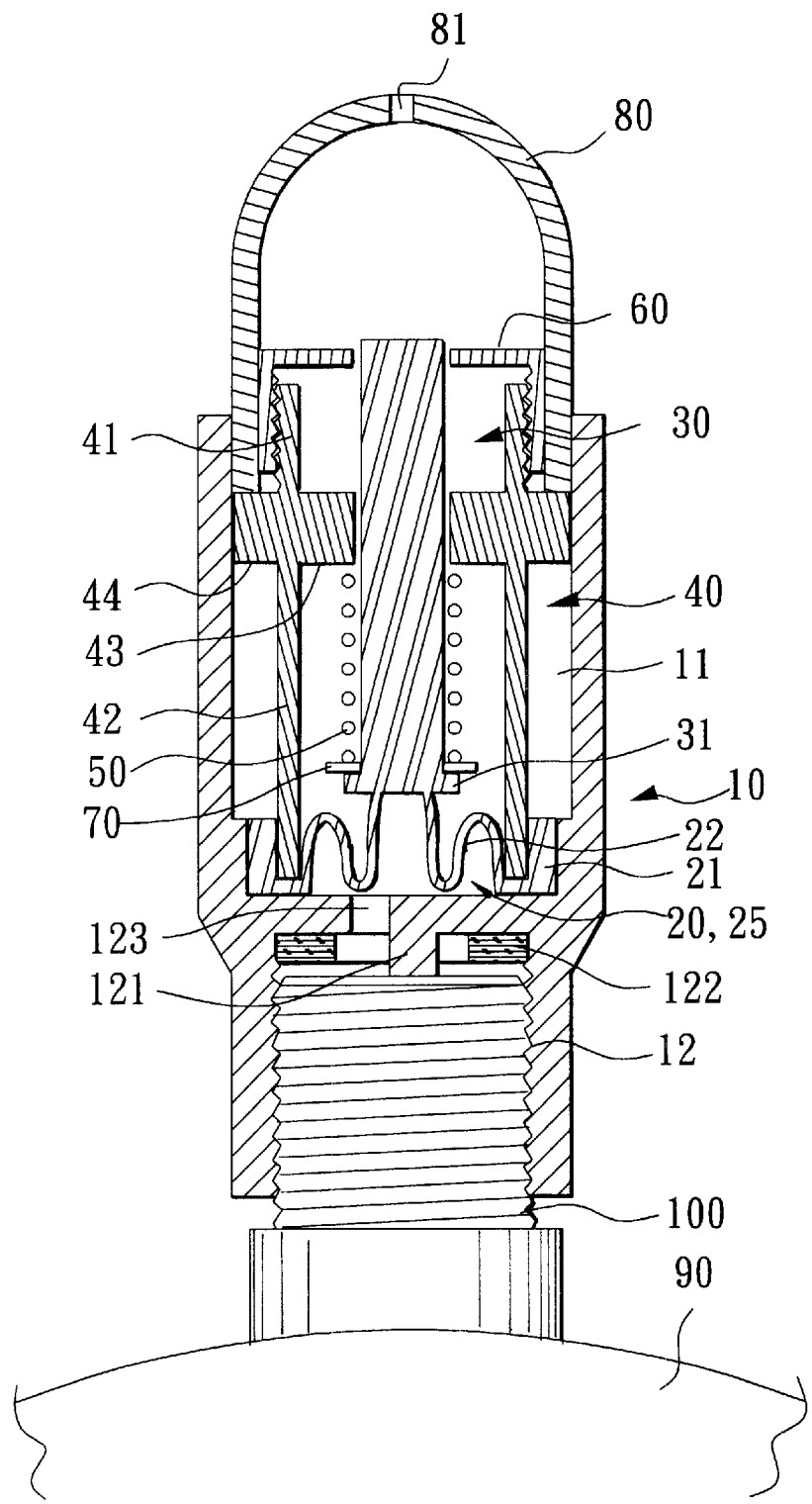
FIG. 2 is a sectional assembly view in an enlarged scale of the diaphragm-type tire pressure indicator according to the first embodiment of the present invention.

Referring to FIG. 2, the casing 10 has a receiving chamber 11 and a coupling unit 12. The coupling unit 12 has a press rod 121, and is mounted with a gasket ring 122. The flexible diaphragm 25 is mounted in the receiving chamber 11 of the casing 10. The push rod 30 is integrally connected to the flexible diaphragm 25, so as to be moved up or down according to the expansion or collapse of the flexible diaphragm 25. The sleeve 40 is mounted in the receiving chamber 11 of the casing 10. The spring 50 is sleeved onto the push rod 30. The flexible diaphragm 25 has a mounting base 21 and a wrinkled expansible portion 22 peripherally connected to the mounting base 21. The mounting base 21 of the flexible diaphragm 25 is positioned at the bottom end 42 of the sleeve 40. The sleeve 40 has an inside flange 43 and an outside flange 44. The push rod 30 has an outward flange 31 radially extended from the bottom edge thereof and fixedly fastened to the expansible portion 22 of the flexible diaphragm 25. The washer 70 is sleeved onto the push rod 30 and supported on the outward flange 31. The spring 50 is sleeved onto the push rod 30 and pressed against the washer 70 and the inside flange 43 of the sleeve 40. The transparent cover 80 is covered on the outside flange 44 of the sleeve 40 over the adjustment cap 60. A through hole 81 is provided on the transparent cover 80.

The present diaphragm type tire pressure indicator provides a micro-calibration function. Referring to FIG. 2 again, the adjustment cap 60 is screwed to the top end 41 of the sleeve 40. The push rod 30 extends out of the adjustment cap 60. By means of adjusting the elevational position of the adjustment cap 60 on the top end 41 of the sleeve 40, the protruding length of the push rod 30 outside the adjustment cap 60 is relatively adjusted, and the calibration of the diaphragm-type tire pressure indicator can be achieved. Therefore, all the diaphragm-type tire pressure indicators to be manufactured can be calibrated to minimize the tolerance, thereby ensuring the accuracy of the manufactured tire pressure indicator.

Figure 3:
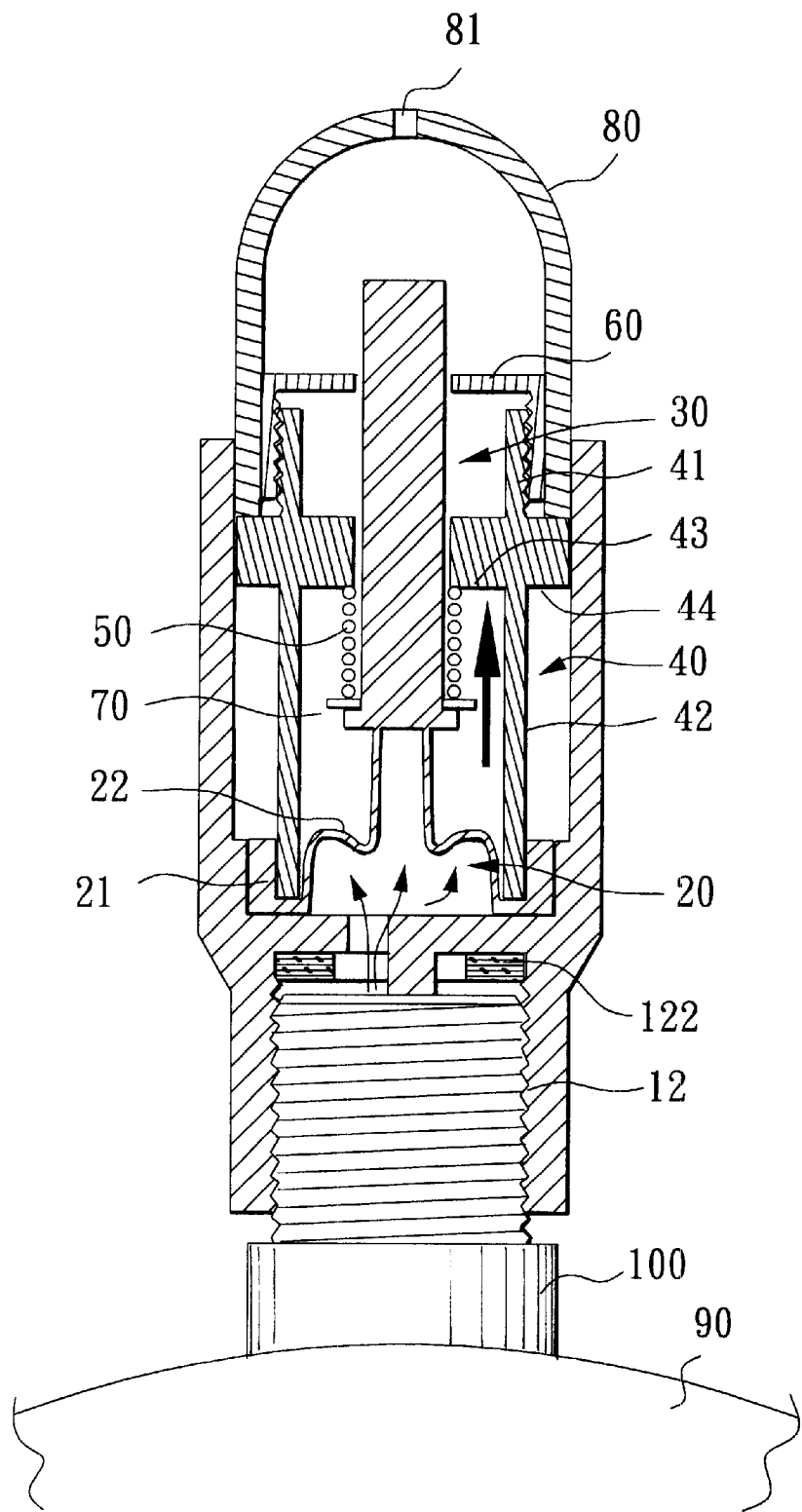
FIG. 3 is a sectional view showing the diaphragm-type tire pressure indicator installed in an inflated vehicle tire according to the first embodiment of the present invention.

In use of the present tire pressure indicator, referring to FIGS. 2 and 3, the coupling unit 12 of the casing 10 of the diaphragm-type tire pressure indicator is fastened to the air nozzle 100 of a tire 90, thereby enabling internal gas of the tire 90 to pass through an air hole 123 in the coupling unit 12 of the casing 10 into the receiving chamber 11, so as to move the expansible portion 22 of the flexible diaphragm 25. Thus, the push rod 30 is moved subject to the air pressure of the tire 90; i.e., the push rod 30 is lifted when the air pressure of the tire 90 is increased, or lowered when the air pressure of the tire 90 is reduced. The push rod 30 can be marked with different colors or with graduations to indicate whether the sensed tire pressure is sufficient or not. For example, the push rod 30 can be colored with yellow, green, and red, or marked with data units at different elevations. The adjustment cap 60 serves as the reference unit. By means of the indication of the adjustment cap 60, the user can visually check the amount and direction of the movement of the push rod 30 relative to the adjustment cap 60, thereby conveniently determining whether the tire pressure is sufficient.

Figure 4:
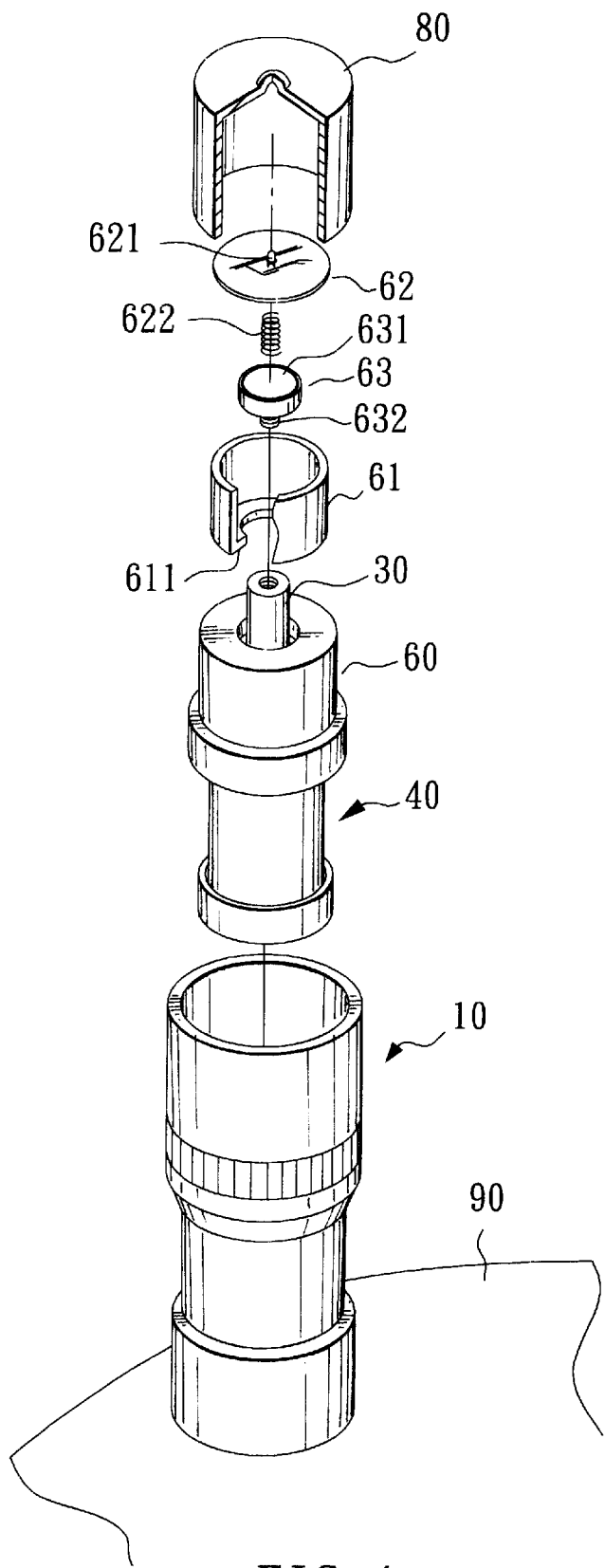
FIG. 4 is an exploded view of the diaphragm-type tire pressure indicator according to a second embodiment of the present invention.
Figure 5A:
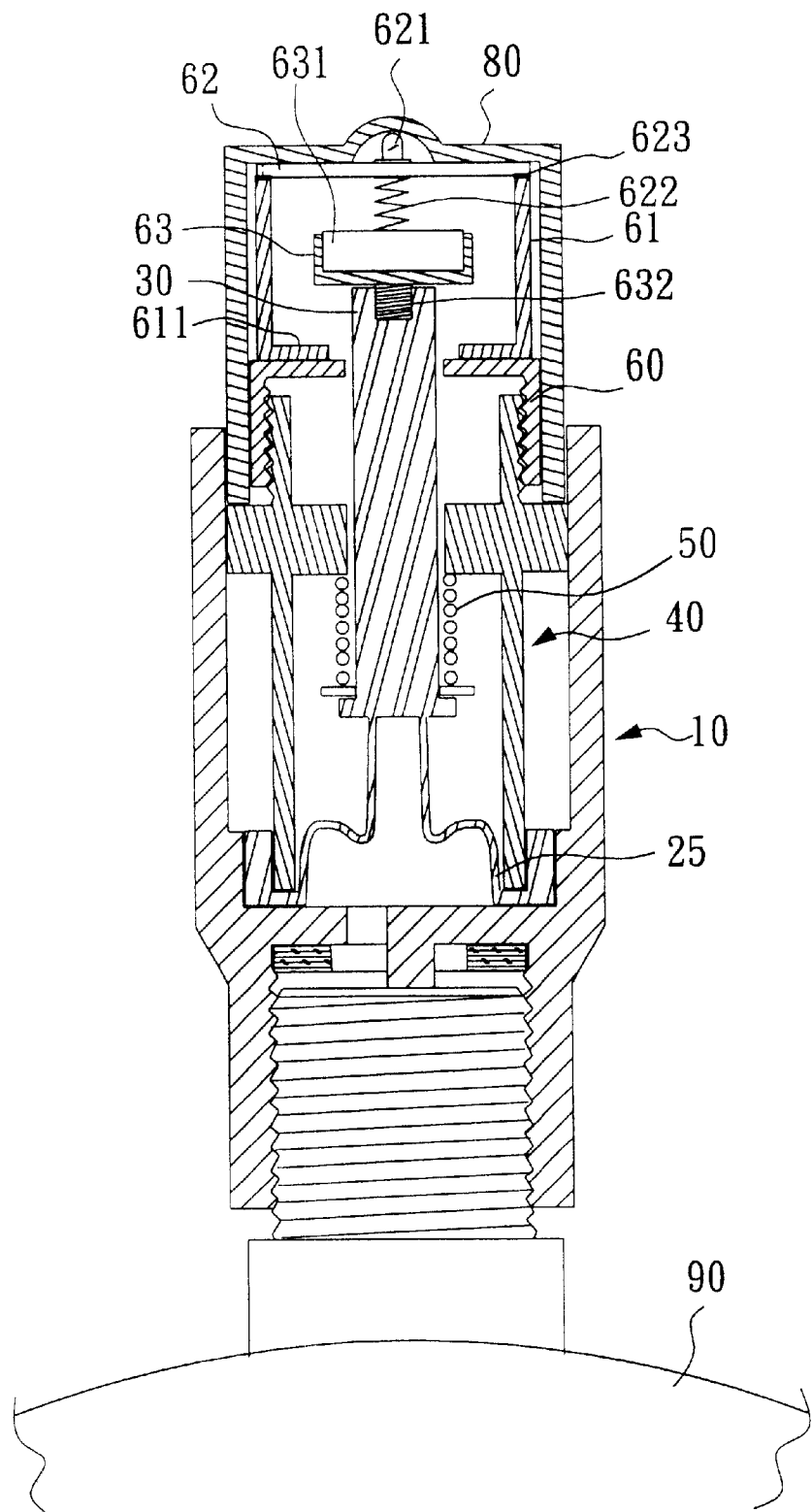
FIG. 5A is a sectional assembly view in an enlarged scale of the diaphragm-type tire pressure indicator installed in an inflated vehicle tire according to the second embodiment of the present invention.

FIGS. 4 and 5A show another preferred embodiment of the diaphragm-type tire pressure indicator according to the present invention. This embodiment is similar to the previous one, in addition to having a conductive member 61 mounted on the adjustment cap 60, a circuit board 62 mounted on the conductive member 61, a light emitting diode 621 installed in the circuit board 62, a battery seat 63 mounted on the push rod 30 to hold a battery cell 631, and a conductive spring 622 disposed between the circuit board 62 and the battery cell 631 in the battery seat 63. The battery seat 63 has a bottom screw rod 632 threaded into the screw hole on the top end of the push rod 30. The conductive member 61 is preferred to be of a cylindrical shape and has an inward bottom flange 611 fixedly fastened to the adjustment cap 60. The light emitting diode 621 has one terminal connected to the conductive spring 622, and the other terminal connected to a conductor 623 which is provided at the bottom edge of the circuit board 62 and disposed in contact with the conductive member 61.

Figure 5B:
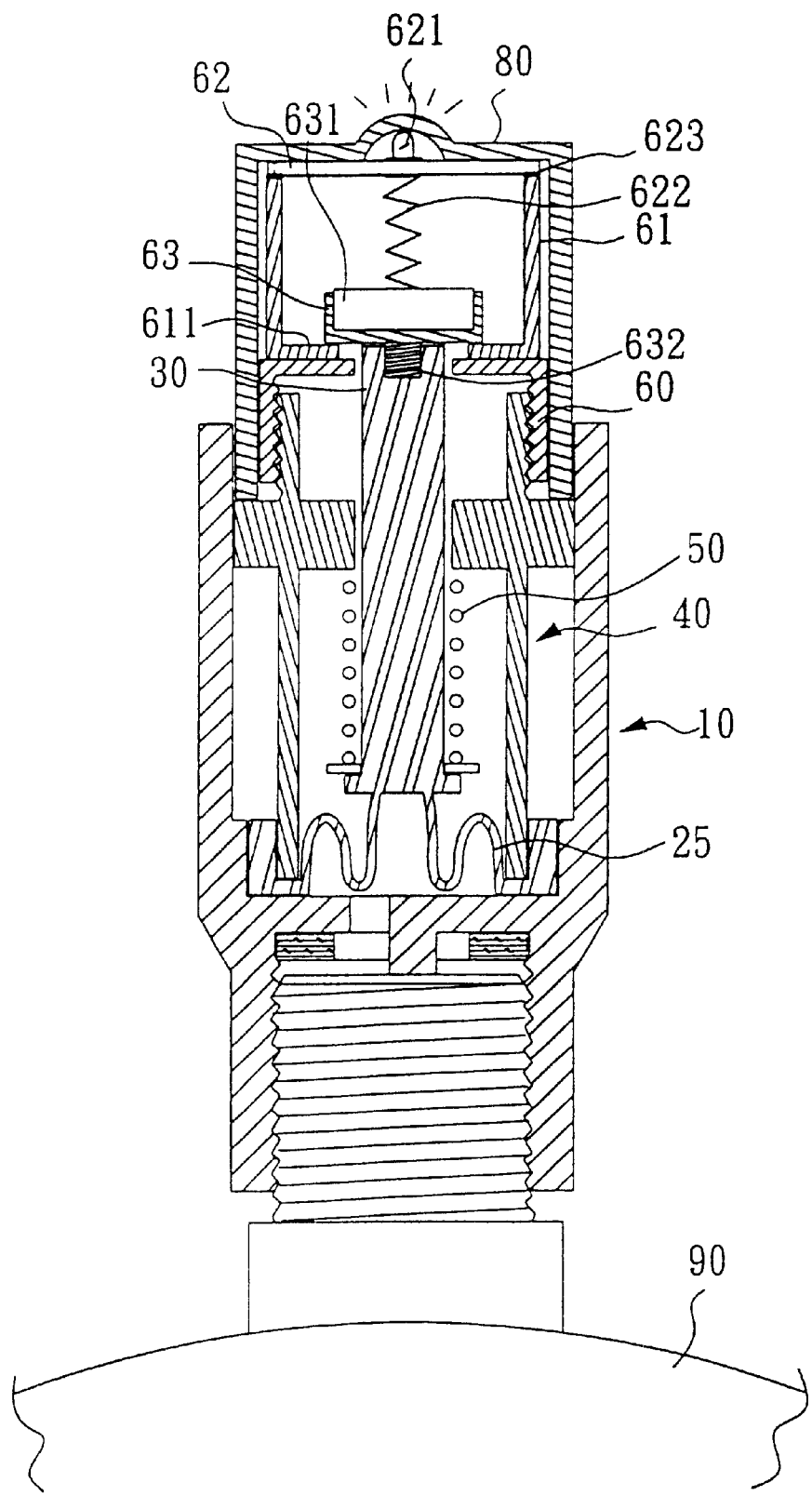
FIG. 5B is a sectional assembly view in an enlarged scale of the diaphragm-type tire pressure indicator installed in a vehicle tire with a low pressure according to the second embodiment of the present invention.

A further micro-calibration function of the diaphragm-type tire pressure indicator can be achieved by means of rotating the bottom screw rod 632 upwards or downwards in the screw hole on the push rod 30. The battery cell 631 has one electrode disposed in contact with the conductive spring 622, and the other electrode electrically connected to the battery seat 63. In assembling, with reference to FIG. 5, the transparent cover 80 is covered on the sleeve 40 to secure the circuit board 62 on the conductive member 61. The battery seat 63 is thus received in the space defined between the circuit board 62 and the conductive member 61. The diameter of the battery seat 63 is greater than the diameter of the space surrounded by the inward flange 611 of the conductive member 61. Therefore, the battery seat 63, when being lowered down, contacts the inward flange 611 of the conductive member 61, causing the battery cell 631 and the light emitting diode 621 to form a circuit loop, and thus the light emitting diode 621 is turned on to emit light. On the contrary, the battery seat 63, when being lifted, is electrically disconnected from the conductive member 61 to turn off the light emitting diode 621. The elevation of the push rod 30 is changed subject to the value of the air pressure of the tire 90; i.e., the push rod 30 is lowered when the air pressure of the tire 90 is reduced. When the air pressure of the tire 90 drops below a predetermined value, the battery seat 63 is lowered with the push rod 30 to touch the inward flange 611 of the conductive member 61, causing the light emitting diode 621 to emit light, as shown in FIG. 5B. Therefore, the user knows immediately the low pressure status of the tire 90 by viewing the lighting status of the light emitting diode 621 even from a long distance away. In this preferred embodiment, the battery seat 61 is lowered down or lifted up by the flexible diaphragm 25 in the same way as the one shown in FIGS. I and 2, and thus a detailed description for the operation of the diaphragm 25 is deemed unnecessary.

Figure 6:
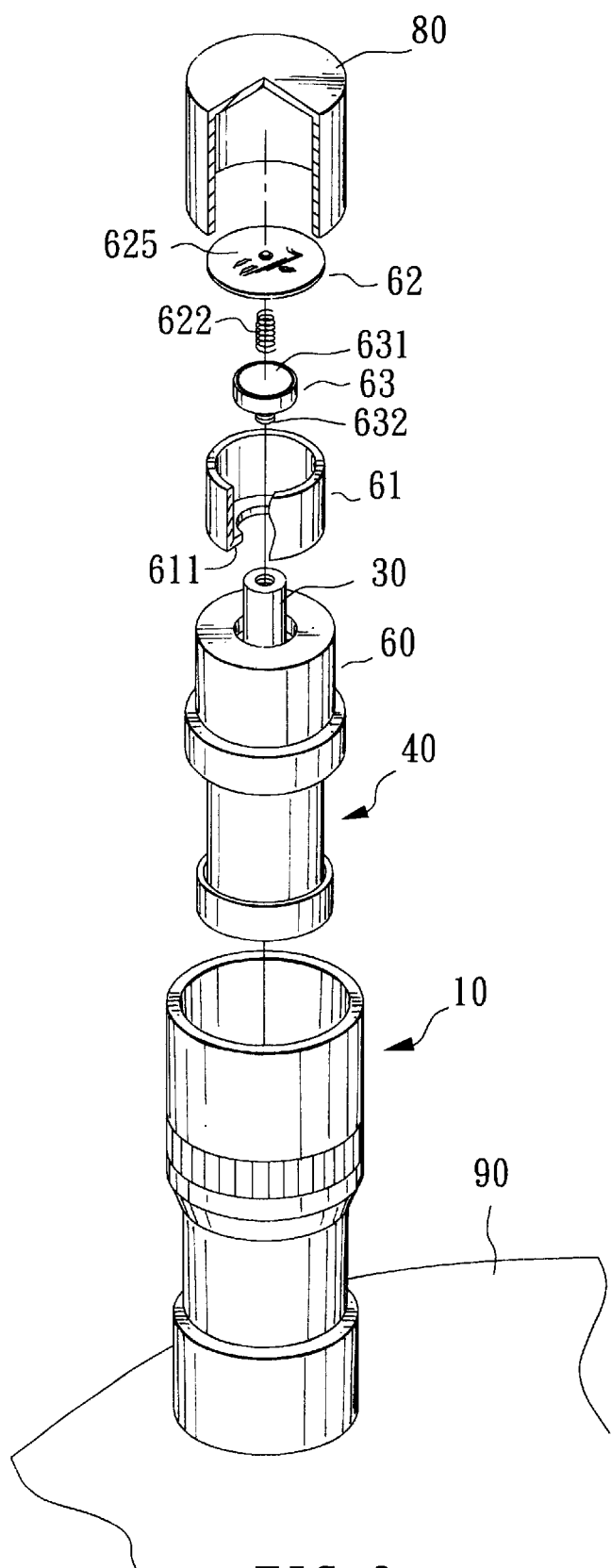
FIG. 6 is an exploded view of the diaphragm-type tire pressure indicator according to a third embodiment of the present invention.
Figure 7A:
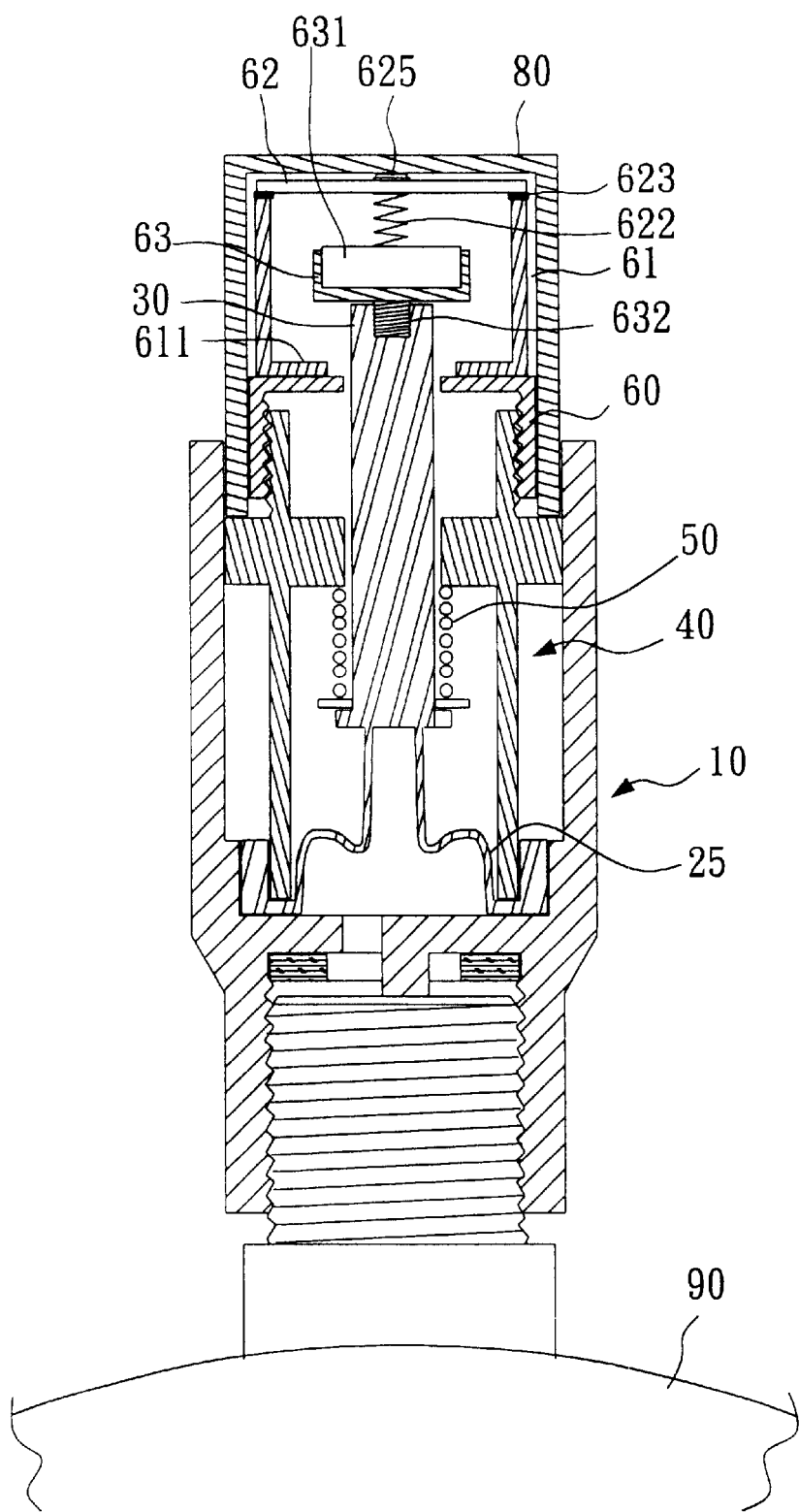
FIG. 7A is a sectional assembly view in an enlarged scale of the diaphragm-type tire pressure indicator installed in an inflated vehicle tire according to the third embodiment of the present invention.
Figure 7B:
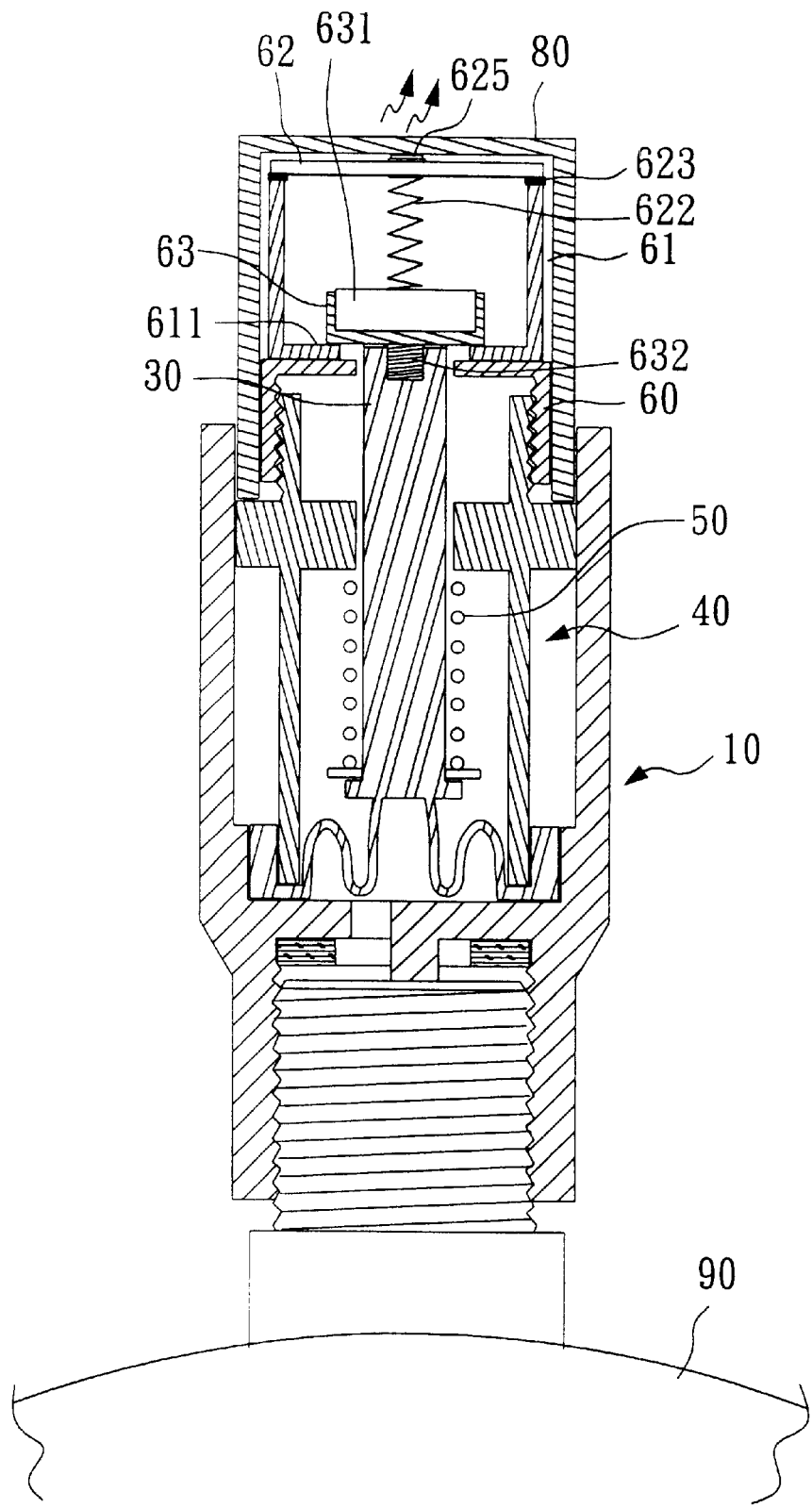
FIG. 7B is a sectional assembly view in an enlarged scale of the diaphragm-type tire pressure indicator installed in a vehicle tire with a low pressure according to the third embodiment of the present invention.

FIGS. 6 and 7A show a further preferred embodiment of the diaphragm-type tire pressure indicator according to the present invention. This embodiment is similar to the one shown in FIGS. 4, 5A and 5B except that an RF transmitter module 625 is installed in the circuit board 62 instead of the aforesaid light emitting diode 621. Furthermore, the cover 80 of this embodiment is not necessary to be transparent. Thus, as shown in FIG. 7B, wen the battery seat 63 is lowered with the push rod 30 to touch the inward flange 611 of the conductive member 61 due to a low air pressure of the tire 90, the power of the battery cell 631 is supplied to the RF transmitter module 625 so as to emit an RF signal, indicating a low tire pressure, to an RF receiver module in the car (not shown).

Figure 8:
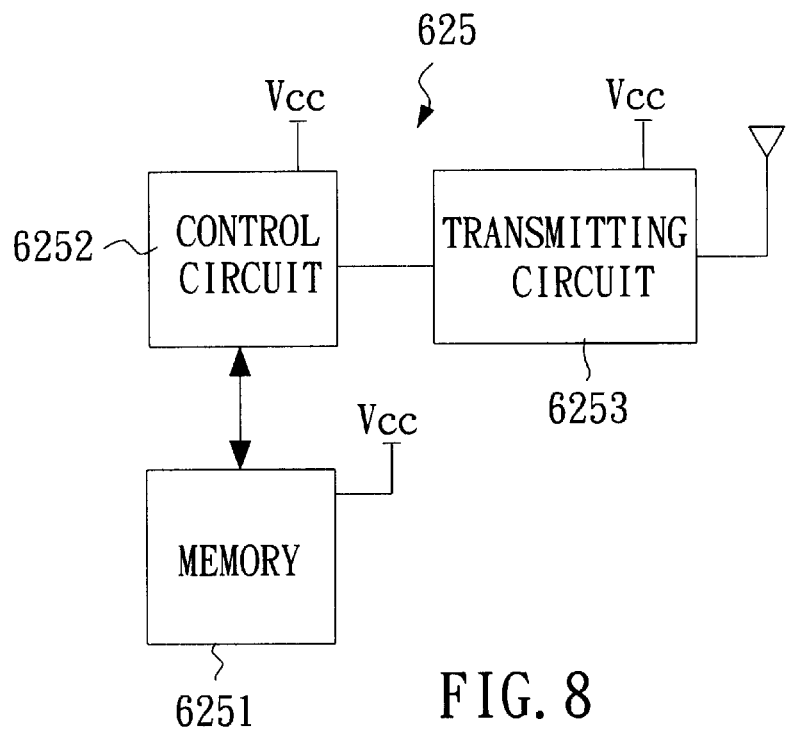
FIG. 8 is a system block diagram of the RF transmitter module for the diaphragm-type tire pressure indicator shown in FIG. 6.
Figure 9:
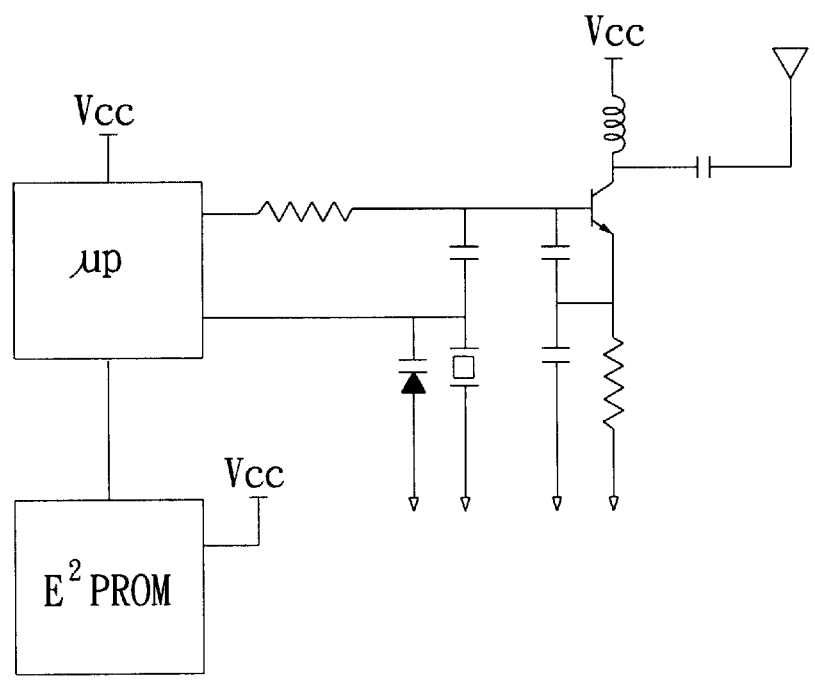
FIG. 9 is a circuit diagram of the RF transmitter module of FIG. 8.

Referring to FIGS. 8 AND 9, the RF transmitter module 625 includes a memory 6251 for storing an RF transmitter ID code and tire code, a control circuit 6252, and a transmitting circuit 6253. When the power of the battery cell 631 is supplied to the RF transmitter module 625 upon low pressure of the tire, the control circuit fetches the ID code of the RF transmitter module 625 and the tire code of the tire that is installed with the RF transmitter module 625 is installed, and then drives the transmitting circuit 6253 to send a radio signal carrying the ID code and the tire code.

Figure 10:
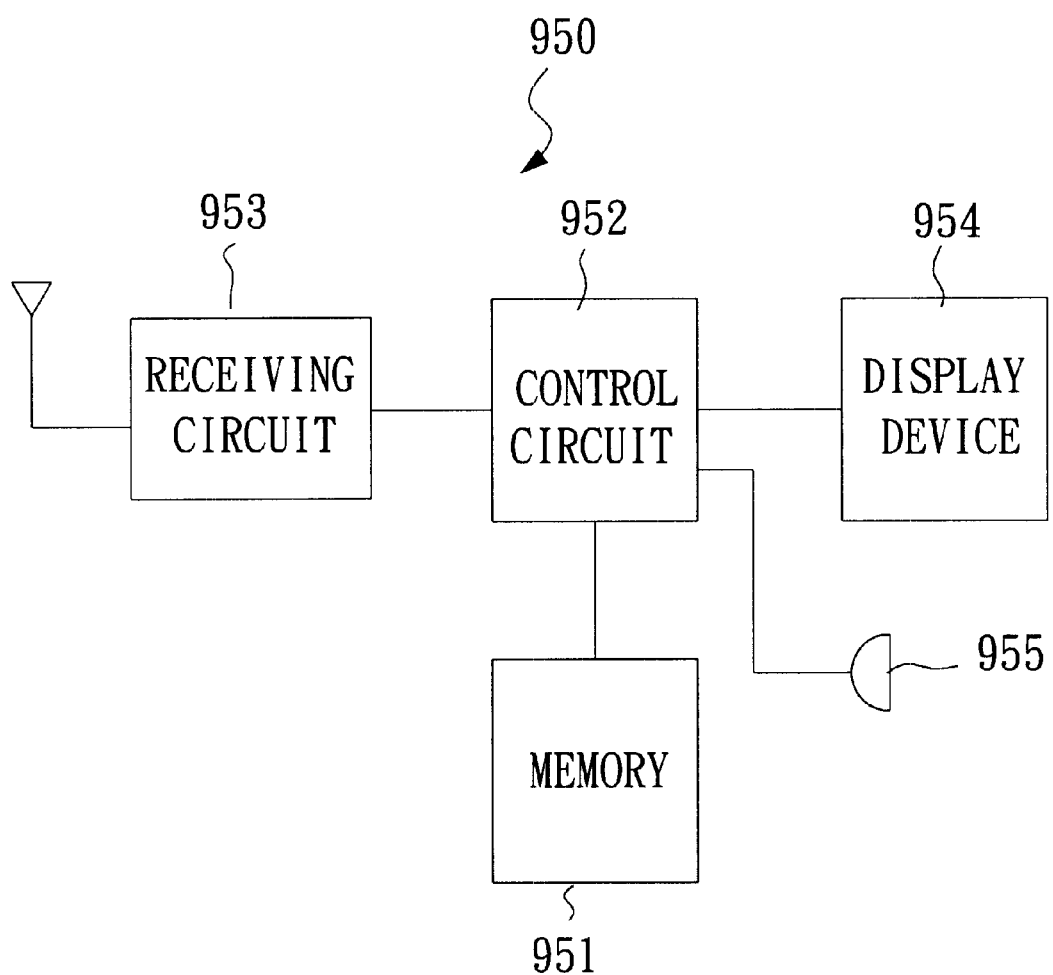
FIG. 10 is a system block diagram of an RF receiver module for use with the RF transmitter module for the diaphragm-type tire pressure indicator shown in FIG. 6.
Figure 11:
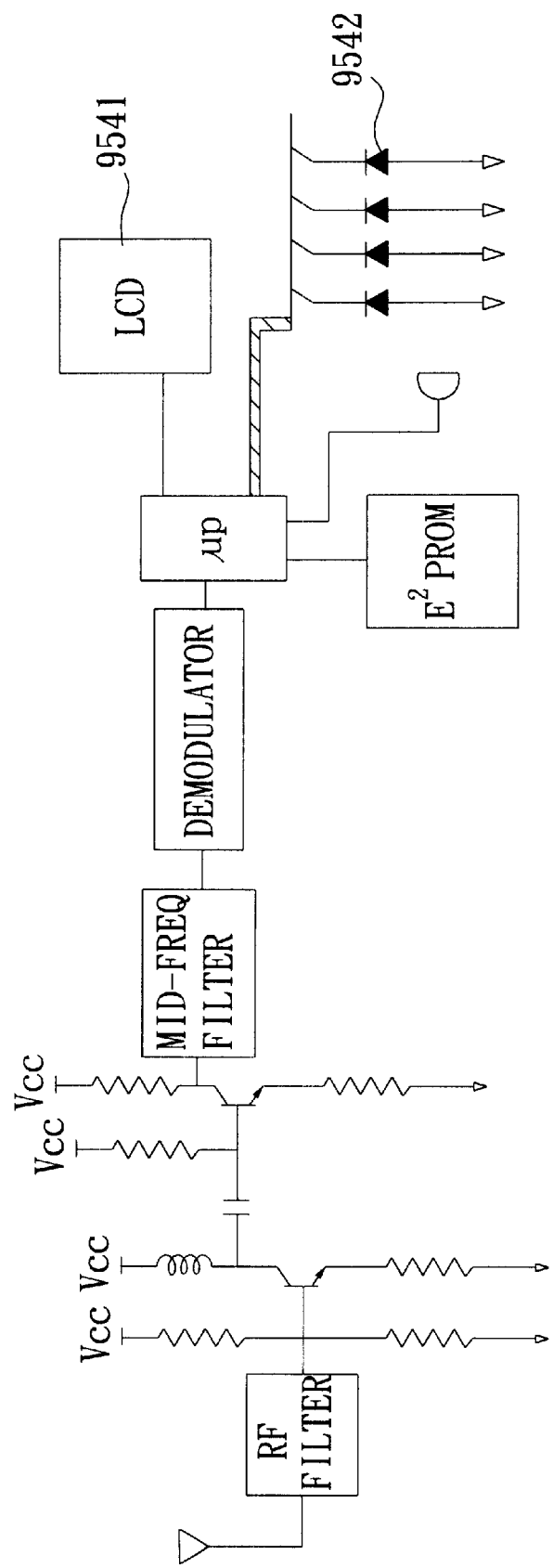
FIG. 11 is a circuit diagram of the RF receiver module of FIG. 10.

FIGS. 10 and 11 are system block diagram and circuit diagram of an RF receiver module 950 installed in the car respectively and adapted to be used with the aforesaid RF transmitter module 625. The RF receiver module 950 comprises a memory 951 for storing the data of the ID code of the RF transmitter module 625 and the tire code, a control circuit 952, a receiving circuit 953, a display device 954, and a buzzer 955. Upon receipt of the radio signal from the RF transmitter module 625, the control circuit 952 fetches the data from the memory 951 for comparing with the data of the radio signal received from the RF transmitter module 625, so as to determine whether a signal is correctly received and recognize the tire with a low pressure. When recognized, a low tire pressure message is shown on the display device 954, or the control circuit 952 drives the buzzer 955 to give an audio alarm signal. In this preferred embodiment, the display device 954 is an LCD (liquid crystal display) 9541 for showing the tire pressure status by graphics. Alternatively, the display device 954 can be a set of LEDs (light emitting diodes) 9542, each representing a tire, so that an LED 9542 is turned on to indicate that the pressure of a specific tire is too low. Therefore, the user needs not to get off the car when checking the status of tire pressure.

In view of the foregoing, the present invention is able to implement a diaphragm-type tire pressure indicator with a simplified structure for alarming the low pressure status of a tire by color, graduation, light, or radio signal. Furthermore, the present invention is able to provide a micro-calibration function or a double micro-calibration function. Thus, the diaphragm-type tire pressure indicator is accurate and easy to be used.

Although the particular embodiments of the invention have been described in detail for purposes of illustration, various modifications may be made without departing from the spirit and scope of the invention. The invention is not to be limited by the aforementioned embodiments except by the appended claims.

What is claimed is:

1. A diaphragm-type tire pressure indicator for being installed in the air nozzle of a vehicle tire to give an indication when the tire pressure of the vehicle tire is low, comprising:

a casing having a receiving chamber and a coupling unit;

a movable diaphragm mounted in the receiving chamber of the casing;

a push rod connected to the movable diaphragm for being moved up and down with the movable diaphragm;

a sleeve mounted in the receiving chamber of the casing and around the push rod, the sleeve having a bottom end and a top end; and a spring means sleeved onto the push rod; and an adjustment cap fastened to the top end of the sleeve in such a manner that the push rod extends out of the adjustment cap, so as to achieve a micro-calibration function by adjusting a position of the adjustment cap relative to the top end of the sleeve.

2. The diaphragm-type tire pressure indicator as claimed in claim 1, wherein the push rod has one end formed integral with the diaphragm.

3. The diaphragm-type tire pressure indicator as claimed in claim 1, wherein the movable diaphragm is a flexible diaphragm.

4. The diaphragm-type tire pressure indicator as claimed in claim 3, wherein the flexible diaphragm comprises a mounting base positioned at the bottom end of the sleeve, and a corrugated expansible portion within the mounting base.

5. The diaphragm-type tire pressure indicator as claimed in claim 1, wherein the sleeve comprises an inside flange and an outside flange; the push rod has an outward flange radially extended from the bottom edge thereof and fixedly connected to the diaphragm; and the spring means is sleeved onto the push rod and positioned between the outward flange of the push rod and the inside flange of the sleeve.

6. The diaphragm-type tire pressure indicator as claimed in claim 5, further comprising a washer sleeved onto the push rod and positioned between the outward flange of the push rod and the spring means.

7. The diaphragm-type tire pressure indicator as claimed in claim 1, further comprising a transparent cover coupled to the casing, the transparent cover having a through hole.

8. The diaphragm-type tire pressure indicator as claimed in claim 1, wherein the coupling unit of the casing comprises a press rod.

9. A diaphragm-type tire pressure indicator for being installed in the air nozzle of a vehicle tire to give an indication when the tire pressure of the vehicle tire is low, comprising:

a casing having a receiving chamber and a coupling unit;

a flexible diaphragm mounted in the receiving chamber of the casing;

a push rod connected to the movable diaphragm for being moved up and down with the movable diaphragm;

a sleeve mounted in the receiving chamber of the casing around the push rod, the sleeve having a bottom end and a top end;

an adjustment cap fastened to the top end of the sleeve in such a manner that the push rod extends out of the adjustment cap, so as to achieve a micro-calibration function by adjusting a position of the adjustment cap relative to the top end of the sleeve;

a spring means sleeved onto the push rod;

a conductive member mounted on the adjustment cap;

a circuit board electrically mounted on the conductive member, the circuit board having a light emitting element; and a battery seat mounted on the push rod for holding a battery cell, the battery cell having a first electrode connected to the light emitting element and a second electrode electrically connected to the battery seat, whereby the battery seat is moved up and down with the push rod relative to the conductive member to selectively contact with the conductive member for turning on the light emitting element.

10. The diaphragm-type tire pressure indicator of claim 9, wherein the conductive member has an inward bottom flange connected to the adjustment cap.

11. The diaphragm-type tire pressure indicator of claim 9, wherein the light emitting diode has a first terminal connected to a conductive spring arranged below the circuit board for electrically connecting the first electrode of the battery cell, and a second terminal connected to a conductor provided at a bottom edge of the circuit board for electrically connecting the conductive member.

12. The diaphragm-type tire pressure indicator of claim 9, wherein the battery seat has a bottom screw rod threaded into a top end of the push rod for being rotated upwards and downwards relative to the conductive member to achieve a micro-calibration function.

13. The diaphragm-type tire pressure indicator of claim 9, wherein the flexible diaphragm comprises a mounting base positioned at the bottom end of the sleeve, and a corrugated expansible portion within the mounting base.

14. The diaphragm-type tire pressure indicator of claim 9, wherein the sleeve comprises an inside flange and an outside flange; the push rod has an outward flange radially extended from a bottom edge thereof and fixedly connected to the movable diaphragm; and the spring means sleeved onto the push rod is arranged between the outward flange of the push rod and the inside flange of the sleeve.

15. The diaphragm-type tire pressure indicator of claim 9, further comprising a transparent cover coupled to the casing to hold down the circuit board.

16. A diaphragm-type tire pressure indicator for being installed in the air nozzle of a vehicle tire to give an indication when the tire pressure of the vehicle tire is low, comprising:

a casing having a receiving chamber and a coupling unit;

a flexible diaphragm mounted in the receiving chamber of the casing;

a push-rod connected to the diaphragm for being moved up and down with the diaphragm;

a sleeve mounted in the receiving chamber of the casing around the push rod, the sleeve having a bottom end and a top end;

an adjustment cap fastened to the top end of the sleeve in such a manner that the push rod extends out of the adjustment cap, so as to achieve a micro-calibration function by adjusting a position of the adjustment cap relative to the top end of the sleeve;

a spring means sleeved onto the push rod;

a conductive member mounted on the adjustment cap;

a circuit board electrically mounted on the conductive member, the circuit board having an RF transmitter module; and a battery seat mounted on the push rod and for holding a battery cell, the battery cell having a first electrode connected to the RF transmitter module and a second electrode electrically connected to the battery seat, wherein the battery seat is moved up and down with the push rod, relative to the conductive member, to selectively contact the conductive member for outputting a radio signal indicating a low pressure of the tire.

17. The diaphragm-type tire pressure indicator of claim 16, further comprising a metal contact member having an inward bottom flange connected to the adjustment cap.

18. The diaphragm-type tire pressure indicator of claim 16, wherein the battery seat comprises a bottom screw rod threaded into a top end of the push rod for being rotated upwards and downwards relative to the metal contact member so as to achieve a micro-calibration function.

19. The diaphragm-type tire pressure indicator of claim 16, wherein the flexible diaphragm comprises a mounting base positioned at the bottom end of the sleeve, and a corrugated expansible portion within the mounting base.

20. The diaphragm-type tire pressure indicator of claim 16, wherein the sleeve comprises an inside flange and an outside flange; the push rod has an outward flange radially extended from a bottom edge thereof and fixedly connected to the flexible diaphragm; and the spring means sleeved onto the push rod is arranged between the outward flange of the push rod and the inside flange of the sleeve.

21. The diaphragm-type tire pressure indicator of claim 16, further comprising a transparent cover coupled to the casing to hold down the circuit board.

22. The diaphragm-type tire pressure indicator of claim 16, wherein the RF transmitter module comprises a memory for storing an ID code of the RF transmitter module and a tire code of the vehicle tire that is installed with the diaphragm-type tire pressure indicator, a control circuit, and a transmitting circuit controlled by the control circuit to transmit data stored in the memory.

* * * * *